United States Patent [19]

Akamatsu et al.

[11] 3,867,352

[45] Feb. 18, 1975

[54] ISOCYANATE-MODIFIED POLYMERS OF ASPARTIC AND GLUTAMIC ACID AND METHOD OF PREPARING THE SAME

[75] Inventors: Akira Akamatsu; Akira Okuaki; Shigeo Mori, all of Kanagawa-ken, Japan

[73] Assignee: Ajinomoto Co., Inc., Tokyo, Japan

[22] Filed: Dec. 20, 1972

[21] Appl. No.: 316,711

Related U.S. Application Data

[63] Continuation-in-part of Ser. No. 265,746, June 23, 1972, abandoned.

[30] Foreign Application Priority Data

July 5, 1971    Japan.............................. 46-49421

[52] U.S. Cl.............260/77.5 R, 260/77.5 AM, 260/77.5 AQ, 260/78 A, 260/858
[51] Int. Cl... C08g 20/00, C08g 20/08, C08g 41/02
[58] Field of Search....... 260/858, 77.5 R, 77.5 AQ, 260/77.5 AM, 78 A

[56] References Cited
UNITED STATES PATENTS 3,371,069   2/1968   Miyamae et al................. 260/78 A
3,585,161   6/1971   Akamatsu et al................. 260/858
3,634,544   1/1972   Takeda et al...................... 260/858

*Primary Examiner*—Murray Tillman
*Assistant Examiner*—J. Ziegler
*Attorney, Agent, or Firm*—Hans Berman; Kurt Kelman

[57]          ABSTRACT

Polymers whose backbone includes aspartic or glutamic acid units, peptide-linked by their amino and α-carboxyl groups, improve greatly in wet strength when contacted in a liquid medium with organic isocyanates until a sufficient number of the ω-carboxyl groups in the side chains of the polymer is converted to groups of the formula $-CO-NH-C$ by reaction with NCO groups of the isocyanate. Compounds having two or more NCO groups may cause cross linking. The high permeability of the glutamic or aspartic acid polymers to moisture, oxygen, carbon dioxide, and solutes in aqueous solutions is not significantly impaired, and may be enhanced by conversion of the ω-carboxyl groups, while wet strength is sharply increased, thereby improving utily of the polymers as dialysis membranes and in like applications.

10 Claims, No Drawings

ISOCYANATE-MODIFIED POLYMERS OF ASPARTIC AND GLUTAMIC ACID AND METHOD OF PREPARING THE SAME

This application is a continuation-in-part of the copending application Ser. No. 265,746, filed on June 23, 1972, and now abandoned.

This invention relates to polymers having repeating units of aspartic or glutamic acid, and particularly to a process of improving the wet strength of such polymers.

Polymers having repeating acidic amino acid units of the formula

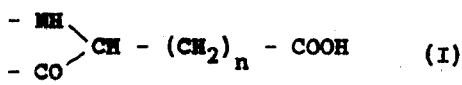

wherein $n$ is 1 or 2, that is, units of aspartic or glutamic acid, are fully absorbed by body tissues and are permeable to gases and to many solutes in aqueous solutions. These properties are of advantage in surgical sutures, films for use in occlusive dressing, dialysis membranes for artificial kidneys, and other purposes which readily suggest themselves. However, the polymers containing enough aspartic or glutamic acid units to show the afore-mentioned desirable properties to a significant extent are very hydrophilic so that they swell by absorbing water, and their wet strength is too low to make them useful in applications in which their other properties would be valuable.

It has been proposed to remedy the water sensitivity of the polymers and copolymers of glutamic and aspartic acid by forming aluminum salts with the ω-carboxyl groups (Japanese Patent Publication No. 9759/1965) or by partly esterifying the same (Japanese Patent Publication No. 26,851/1965), but the products obtained and/or the procedures required for forming the products have been found impractical.

It has now been discovered that the water resistance of solid polymers or copolymers having repeating units of the above formula can be greatly increased by contacting the polymers in a liquid medium with organic isocyanates in which the —NCO group is directly bound to carbon, without impairing the desirable permeability and without preventing absorption of the reaction products by animal tissue, although such absorption is normally retarded. Depending on the extent to which the ω-carboxyl groups are converted by reaction with —NCO groups to produce modified units of the formula

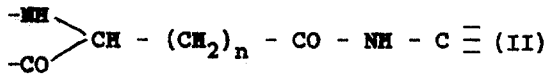

the swelling by water absorption and the rate of absorption of the modified polymer by animal tissue may vary over a wide range.

The process of the invention is applicable to homopolymers of aspartic and glutamic acid which consist essentially of units of the first formula, to copolymers of the acidic amino acids with their lower-alkyl and benzyl esters, the term "lower alkyl," as employed herein, designating groups having one to four carbon atoms in straight or branched chains, and to copolymers of the acidic amino acids with other amino acids jointly forming a peptide-linked backbone.

The acidic amino acid units may be prepared from aspartate or glutamate ester units of polymers by saponification or by catalytic hydrogenation or reaction with hydrogen bromide or phosphonium iodide in a manner known in itself. The polymers may initially have repeating units of esters of the acidic amino acids with lower alkanols, but also with benzyl alcohol. The polymeric esters are staple articles of commerce or readily prepared from commerically available starting materials.

The amino acids which may form peptide linkages with the aspartic and glutamic acid units in the backbone of the polymer include the α-amino acids such as the neutral amino acids glycine, alanine, valine, norvaline, leucine, isoleucine, norleucine, phenylalanine, also N-derivatives of basic amino acids such as N$^\epsilon$-acetyllysine, N$^\epsilon$-butyroyllysine, N$^\epsilon$-carbobenzoxylysine, N$^\gamma$-acetylornithine, and N$^\gamma$-butyroylornithine, and O-derivatives of amino acids containing hydroxyl groups such as O-methylserine, O-acetylserine, O-methylthreonine, and O-acetylthreonine. Other suitable amino acids will be evident from these examples.

Polyamino acids containing ω-esters of the units of Formula (I) are readily obtained by polymerizing or copolymerizing the corresponding N-carboxy anhydrides of the monomeric esters, themselves available by phosgene treatment of the amino acid esters. The degree of polymerization may be chosen freely to suit the intended application, and suitable intrinsic viscosities for forming films or fibers will be exemplified below.

The desirable physical and chemical properties of the solid polymers of the invention are not affected by the configuration of the amino acid units at their asymmetrical carbon atoms, and the optically active enantiomorphs are not different in their relevant properties from the racemates.

The polymers employed as starting materials of the invention may also be compounded, within the limits imposed by the desired properties of the product, with other compounds of high molecular weight, such as polyamides, polyesters, polyurethanes, polyethers, polyester amides, polymers and copolymers of acrylonitrile, vinyl chloride, vinyl alcohol, vinyl acetate, acrylamide, methacrylamide, acrylic acid, methacrylic acid, esters of the last-mentioned acids, natural rubber, and synthetic elastomers. Block copolymers containing groups of repeating units of amino acids and other monomer moieties may benefit from the process of the invention. The ultimately produced polymer or polymer mixture may be combined further with plasticizers, fillers, coloring agents, and like conventional additives.

The shape of the solid starting material may be chosen to suit the intended application of the modified polymer, and films, tubes, hollow and solid fibers having ω-ester groups in their amino acid units have been converted to the free acids, and thereafter reacted with organic isocyanates without significantly changing the shape of the solid body. The water-soluble salts of the polyamino acids are converted to the free acids by acidifying their solutions.

The choice of organic isocyanates employed for converting the repeating units of Formula (I) into units of Formula (II) is limited only by the availability or reactivity of the NCO group or groups in the isocyanate and by the necessity of avoiding functional groups or other constituents which would interfere with the conversion of the carboxyl groups. Heterocyclic or inorganic isocyanates are excluded from consideration for this reason. Isocyanates in which the NCO group is bound to carbon in an aromatic, aliphatic, alicyclic group are suitable. Compounds having more than one reactive NCO group may cross link the peptide chains of the starting material.

The following mono-isocyanates have been used successfully in the process of the invention, but do not exhaust the virtually unlimited range of available modifiers:

Phenyl isocyanate and its mono-, di- and tri-chloroderivatives regardless of the position of the chlorine atom or atoms relative to the NCO group; $\alpha$- and $\beta$-isocyanatonaphthalene; the alkyl isocyanates including the methyl, ethyl, propyl, butyl, n-hexyl, and lauryol isocyanates; and cyclohexylisocyanate.

Organic isocyanates having functional groups other than NCO groups which are not capable of reacting with the polymer may also be employed, and their functional groups or other reactive constituents may be used for secondary modification of the polymer, as will be illustrated hereinbelow with specific reference to $\alpha$-isocyanatosuccinic anhydride, a compound merely illustrative of this broad class of organic isoycanates including, among many others, such compounds as 1-isocyanato-4-pyridinylbutane.

Cross-linking of peptide chains in the polymer usually occurs if the organic isocyanate employed as a modifier has more than one NCO group. Organic diisocyanates used successfully for this purpose include the 2,4- and 2,6-tolylene diisocyanates, 4,4'-diisocyanatodiphenylmethane, the phenylene diisocyanates, 1,3-diisocyanato-4-chlorobenzene, 1,6-diisocyanatohexane, 1,10-diisocyanatodecane, the lower alkyl esters of 2,6-diisocyanatocaproic acid and 2,5-diisocyanatovaleric acid, 1,4-diisocyanatocyclohexane, 1-isocyanato-3-isocyanatomethyl-3,5,5,-trimethylcyclohexane, di(4-isocyanatocyclohexyl) methane, and 1,5-diisocyanatotetrahydronaphthalene.

The organic polyisocyanates suitable for the process of this invention further include the reaction products of polyhydric alcohols (trimethylolpropane, pentaerythritol) with organic compounds having two isocyanate groups and employed in excess, also the analogous urethane prepolymers and polyurethanes having terminal NCO groups, such as those prepared from an excess of an organic diisocyanate and a polyalkylene glycol, a polyalkylene glycol ether, polyesters having multiple available hydroxyl groups, or the like, the diisocyanates being chosen from the preceding paragraph or otherwise.

The reaction between a solid polymer having repeating units of Formula (I) and the isocyanate or isocyanates is performed in a liquid medium which may consist of the isocyanate alone or of a solution of the isocyanate or isocyanates in a suitable solvent chemically inert to the isocyanate and physically inert to the polymer, that is, incapable of dissolving the polymer. It is often desirable that the solvent be capable of being absorbed in the polymer sufficiently to swell the same in order to permit the desired reaction to occur throughout the cross section of the polymer body, and not to be limited to a surface layer.

Suitable solvents include dimethylformamide, dimethylacetamide, N-methylpyrrolidone, $\gamma$-butyrolactone, ethylene carbonate, dioxane, tetrahydrofuran, acetone, methylethylketone, ethyl acetate, benzene, toluene, chlorobenzene, dichlorobenzene, methylene chloride, carbon tetrachloride, dichloroethane, trichloroethylene, tetrachloroethylene, and mixtures of these solvents.

The reaction rate is increased if the solvent can swell the polymer or if it contains a tertiary amine as a reaction accelerator.

The ratio of the isocyanate to the polymer or to the acidic radicals of Formula (I) in the polymer may be chosen at will to suit the desired rate of reaction and degree of substitution of the carboxyl groups. The rate of reaction may be adjusted further by selecting the concentration of the isocyanate in the liquid medium, the temperature, and the specific solvent system, and the degree of substitution under otherwise fixed conditions is affected by the reaction period. In view of the many uses to which the products of the invention may be applied, and the corresponding range of preferred properties, no meaningful limits can be set for the operating variables, other than those inherent in the need not to destroy the product faster than it is formed, as by pyrolysis.

The shape and dimensions of a solid polymer including the units of Formula (I) are not materially altered by the process of the invention. When the desired substitution of $\omega$-carboxyl groups is achieved, the modified polymer body is withdrawn from the reaction medium, washed in a suitable solvent to remove unreacted isocyanate from its surface, and dried.

The following Examples are further illustrative of this invention. Ratios and percentages in the Examples are by weight unless stated otherwise.

EXAMPLE 1

A film of poly-L-glutamic acid, 26 $\mu$ thick, was cut into squares 20 cm long. The polymer had an intrinsic viscosity of 1.53, as measured at 30°C in an aqueous, 5% sodium bicarbonate solution. Four squares were immersed in 500 ml of a mixture of equal weights of dioxane and dimethylformamide, and 25 g 2,6-diisocyanatocaproic acid methyl ester were stirred into the solvent mixture at room temperature. Individual films were withdrawn after 3, 7, 18, and 24 hours, washed with dioxane, and dried. They were compared with each other and with an untreated control for chemical and physical properties.

The free carboxyl groups present were determined by dissolving a sample in standard sodium hydroxide solution and titrating the remaining free hydroxide. The results, calculated in percent of the initially present carboxyl groups, are listed in Table 1 below.

Dry tensile strength and elongation were determined on strips 15 mm wide on a conventional testing machine. Wet tensile strength and swelling in distilled water at pH 6 were measured according to ASTM Standard D-1239. The method of Japanese Industrial Standards Z-0208 was employed for measuring moisture permeability, and permeability to oxygen and carbon dioxide was determined at 22°C, 1 atm., according to Lyssy's method.

The dialyzer and positive displacement pump of an Autoanalyzer (Technicon Co. Inc.) were employed for determining the period needed for reducing the concentrations of urea and L-valine respectively from 1/100 mole per liter to one half that value by dialysis through the films against distilled water at pH 6.0. As a reference standard, Cuprophane films (Bemberg Co., Inc.) were subjected to the same test, and the figures in Table 1 indicate the ratio of the half-time period for each tested sample to that for the reference standard. The untreated film could not be subjected to dialysis tests under the same condition because of its insufficient strength.

TABLE 1

| Immersion time, hrs. | 0 | 3 | 7 | 18 | 24 |
|---|---|---|---|---|---|
| Carboxyl, % | 100 | 94 | 89 | 82 | 76 |
| T.S., dry, kg/mm$^2$ | 3.46 | 3.68 | 4.12 | 4.22 | 4.16 |
| Elongation, % | 105 | 91 | 18 | 23 | 19 |
| T.S., wet, kg/mm$^2$ | 0.31 | 0.46 | 8.21 | 7.84 | 8.13 |
| Water absorption, % | 265 | 233 | 73 | 64 | 41 |
| Moisture perm'y, g/m$^2$/24 hrs. | 1963 | 1880 | 1825 | 1980 | 1713 |
| Oxygen perm'y, l/m$^2$/24 hrs. | 11 | 13 | 15 | 14 | 14 |
| CO$_2$ perm'y, l/m$^2$/24 hrs. | 104 | 133 | 126 | 158 | 149 |
| Dialysis of urea | — | 1.7 | 1.7 | 1.1 | 1.3 |
| Dialysis of L-valine | — | 1.6 | 1.3 | 1.1 | 0.9 |

As is evident from the Table, there was a sudden increase in dry tensile strength, and an even more drastic improvement in wet strength when the number of free carboxyl groups was reduced by approximately 10%, while dry elongation and water absorption dropped sharply. The permeability to moisture, oxygen, and carbon dioxide and the rate of removal of urea and valine from their aqueous solutions by dialysis improved steadily as carboxyl groups were reduced to 76% of the original value.

The sudden change in mechanical properties observed near 90% carboxyl was accompanied by a sudden change from ready solubility in 5% sodium bicarbonate solution at room temperature (20°C) to substantial insolubility at 89% carboxyl content.

EXAMPLE 2

A film of poly-γ-ethyl L-glutamate having an intrinsic viscosity of 1.09 in dichloracetic acid at 30°C was immersed first in a solution of sodium hydroxide in aqueous ethanol (1:4 by weight) and thereafter in dilute methanolic hydrochloric acid until 89% of the original carbethoxy groups were converted to carboxyl. The film was next immersed in dimethylformamide to remove other solvent and cause some swelling, and thereafter 15 hours in 100 ml of a 20% dimethylformamide solution of a linear urethane prepolymer having two terminal isocyanate groups (4% NCO) at 50°C. It was then washed with dioxane and airdried.

The urethane prepolymer was prepared from ethylene glycol adipate polyester having a molecular weight of approximately 1100 and an excess of 1,6-diisocyanato-n-hexane.

The modification of the polyglutamic acid film by the urethane prepolymer reduced the carboxyl groups from 89% to 42%, increased the dry tensile strength from 3.46 to 4.15 kg/mm$^2$ and wet tensile strength from 0.52 to 1.13 kg/mm$^2$, while water absorption was decreased from 180% to 53%, and the previous solubility in 5% NaHCO$_3$ solution was lost. No significant change was found in the permeability to moisture, oxygen, and carbon dioxide, and the dialysis values of urea and L-valine after the treatment were 1.4 and 1.3 respectively. All tests were performed as in Example 1.

EXAMPLE 3

A film of poly-β-ethyl L-aspartate having an intrinsic viscosity of 1.25 (30°C, dichloroacetic acid) was partly hydrolyzed by immersion in aqueous sodium hydroxide solution and then acidified in dilute methanolic hydrochloric acid, whereby 31% of the original carbethoxy groups were converted to carboxyl. The film then was immersed in 500 ml dioxane, and 0.1 g dibutyltin laurate and 10 g 1-isocyanato-3-isocyanatomethyl-3,5,5-trimethylcyclohexane were added. After immersion for 20 hours at 60°C, the film was washed with dioxane and airdried at 60°C. It was then tested as in Example 1.

The number of carboxyl groups had been reduced from 31% of the initial ester groups to 18% with an accompanying increase in dry tensile strength from 1.31 to 2.56 kg/mm$^2$ and increase in wet strength from 0.62 to 1.44 kg/mm$^2$. The dry elongation decreased from 56% to 23% and the water absorption from 82% to 37%. There was a slight decrease in the permeability to moisture (1980 to 1720 g/m$^2$/24 hours), oxygen (16 to 13 liter/m$^2$/24 hrs.), and CO$_2$ (195 to 164 liter/m$^2$/24 hrs.). The dialysis of urea and valine was essentially unchanged. The treated and untreated films were both insoluble in 5% sodium bicarbonate solution.

EXAMPLE 4

A copolymer of γ-methyl-L-glutamate-DL-methionine was prepared by stirring 8.42 g γ-methyl L-glutamate N-carboxy anhydride and 2.63 g DL-methionine N-carboxy anhydride into a solution of 60 mg triethylamine in 100 ml 1,1,2-trichloroethane at 5°C. Stirring was continued for 24 hours while the temperature was allowed to rise to ambient temperature. The resulting clear, viscous solution was extruded from a fine nozzle into methanol. The precipitated fibrous copolymer was washed with methanol and dried. It weighed 7.9 g and had an intrinsic viscosity of 0.95 at 30°C in dichloroacetic acid.

The carbomethoxy groups present were saponified 95% by immersion in a solution of sodium hydroxide in a water-ethanol mixture (1:3 by weight), and the partly saponified copolymer was washed with methanol, dried, and dissolved in four weights of water.

A glass test tube, 5 cm wide and 30 cm long, was coated with the aqueous, 20% copolymer solution to a thickness of 100 μ, and the coated tube was immersed at once in an aqueous solution of 10% sulfuric acid and 10% Glauber salt to coagulate the polymer which was then washed with water until the washings were free from sulfate, and thereafter air-dried overnight.

The test tube, still enveloped by the copolymer film, was immersed overnight at room temperature in one liter of a 4:1 mixture of dioxane and dichloroethane to which 10 g 4,4'-diisocyanato-diphenylmethane was added. It was then washed with dioxane and air-dried, whereupon the film was stripped from the glass tube and was found to contain 38.2% carboxyl groups based on the total number of amino acid groups present. It thus consisted of 25% methionine, 3.75% γ-methyl-L-glutamate, 38.2% L-glutamic acid, and 33.05% cross linked glutamic acid, the percentage values in this instance being in moles. It duplicated approximately the shape of the glass tube on which it had been prepared.

An aqueous egg albumen solution containing sodium sulfate as an impurity was placed in the polymer tube whose open end was then sealed by tying it, and the sealed tube was stored in water at 3°C. The sodium content of the albumin solution was reduced to less than 10% of the original value after 12 hours.

A copolymer film prepared in an analogous manner, but not modified and cross-linked by reaction with the organic isocyanate disintegrated in water too quickly to permit comparison tests for its value as a dialysis membrane.

EXAMPLE 5

Three sets of polyethylene plates were wound loosely with bundles of poly-L-glutamic acid fibers containing each 50 3-denier monofilaments. The plates were immersed in 500 ml dioxane to permit some swelling of the filaments whereupon 30 g 2,6-diisocyanatocaproic acid ethyl ester was added. The mixture was held at 40°C, and the plates were withdrawn after 3, 6, and 12 hours respectively, washed with dioxane, and air-dried.

In comparison tests of the three sets of modified filaments with untreated filaments, it was found that the carboxyl groups present were gradually reduced by the treatment from 100% to 95%, 91%, and 85%, while dry strength changed from 2.87 g/d to 2.68, 3.40, and 3.91 g/d, and wet strength from 0.65 g/d to 1.83, 1.98, and ultimately 2.38 g/d. Elongation dropped from 20% to 10, 4.6, and finally 5.8%. When the several types of filaments were exposed to blood serum at 37°, the dissolution time increased gradually from 6.5 hours for the untreated fibers to 48, 120, and 120 hours.

EXAMPLE 6

A copolymer of β-methyl L-aspartate and L-leucine (4:1 by weight) was prepared as in Example 4 to an intrinsic viscosity of 0.86 (30°C, dichloroacetic acid) and converted to a film, 20 μ thick. The carbomethoxy groups were saponified 92% to carboxyl by treatment with sodium hydroxide in aqueous ethanol and neutralization with dilute hydrochloric acid in methanol as in Example 2. The washed and dried film was then cut into pieces which were immersed in liquid baths as follows:

A. 24 Hours at 45°C in a 50% solution of phenyl isocyanate in dimethylformamide.

B. 24 Hours at room temperature in a 20% solution of α-isocyanatosuccinic anhydride, followed by 1 hour at room temperature in a 20% dimethylformamide solution of hexamethylenediamine.

C. 24 Hours at room temperature in dimethylformamide without isocyanate.

D. 17 Hours at room temperature, thereafter 30 minutes at 60°C in 1,6-diisocyanato n-hexane without an inert solvent.

All samples were then washed with tetrahydrofuran, airdried, and tested by the method described in Example 1. The results are listed in Table 2.

Table 2

| Sample | A | B | C | D |
|---|---|---|---|---|
| Carboxyl, % | 24 | 72 | 74 | 63 |
| T.S., dry, kg/mm² | 1.73 | 2.66 | 1.87 | 1.54 |
| Elongation, % | 32 | 73 | 76 | 21 |
| T.S., wet, kg/mm² | 1.25 | 1.26 | 0.21 | 1.13 |
| Water absorption, % | 21 | 92 | 131 | 38 |
| Moisture permeability g/m²/24 hrs. | 1720 | 2720 | 2630 | 2131 |
| Oxygen perm'y, 1/m²/24 hrs. | 15 | 22 | 14 | 15 |
| CO₂, perm'y, 1/m²/24 hrs. | 131 | 148 | 128 | 133 |
| Dialysis of urea | 1.3 | 2.1 | 0.8 | 0.9 |
| Dialysis of L-valine | 0.7 | 1.9 | 0.7 | 1.3 |

The product formed in the first stage of method (B) must be assumed to be free of available NCO groups because it did not show the IR absorption at about 2270 cm⁻¹ characteristic for NCO. It follows that the intermediate had repeating groups of the formula

Subsequent treatment with hexamethylenediamine caused cross linking of two molecules of the intermediate with opening of the anhydride ring.

What is claimed is:

1. A process of improving the wet strength of a solid polymer having repeating units of the formula

which comprises contacting said polymer in a liquid medium with an organic isocyanate having at least one reactive NCO group bound to carbon until a sufficient number of the carboxyl groups in said formula is converted to groups of the formula

— CO — NH — substantially to increase said wet strength, $n$ being 1 or 2, said medium being incapable of dissolving said polymer.

2. A process as set forth in claim 1, wherein said polymer is formed prior to said contacting by saponifying ester groups in a polymer having repeating units of the formula

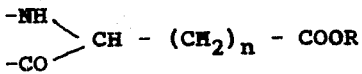

wherein $n$ is 1 or 2, and R is lower alkyl having up to four carbon atoms or benzyl.

3. A process as set forth in claim 1, wherein said isocyanate is of the formula $R_1$ — NCO, $R_1$ being an organic radical free from constituent elements capable of reacting with said polymer.

4. A process as set forth in claim 1, wherein said isocyanate is a compound of the formula OCN — $R_2$ — NCO, wherein $R_2$ is a divalent organic radical free from constituent elements capable of reacting with said polymer.

5. A process as set forth in claim 4, wherein said isocyanate is urethane prepolymer having terminal isocyanato groups.

6. A process as set forth in claim 1, wherein said liquid medium includes a solvent chemically inert to said polymer and to said isocyanate.

7. A process as set forth in claim 1, wherein said polymer prior to said contacting is soluble in 5% aqueous sodium bicarbonate solution at 20°C, and is contacted with said isocyanate until substantially insoluble in said sodium bicarbonate solution.

8. A process as set forth in claim 1, wherein the carbon bound to said at least one NCO group of said organic isocyanate is a member of an aliphatic, cycloaliphatic, or aromatic radical.

9. A solid polymer, insoluble in 5% aqueous sodium bicarbonate solution at 20°C and having repeating units of the formula

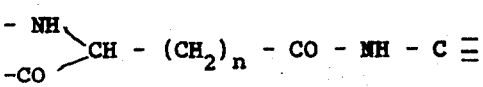

wherein $n$ is 1 or 2, and said —NH—CH—CO are in the backbone of said polymer.

10. A process as set forth in claim 1, wherein said carbon in said isocyanate is a member of an aromatic, aliphatic, or alicyclic group.

* * * * *